United States Patent
Kim et al.

(10) Patent No.: US 10,752,754 B2
(45) Date of Patent: Aug. 25, 2020

(54) HEAT-RESISTANT RESIN AND METHOD OF PREPARING THE SAME

(71) Applicant: LG CHEM, LTD., Seoul (KR)

(72) Inventors: Chang Sull Kim, Daejeon (KR); Joo Byung Chai, Daejeon (KR); Tae Young Jeon, Daejeon (KR); Young Min Kim, Daejeon (KR); Yu Sung Jung, Daejeon (KR); Jong Beom Kim, Daejeon (KR); Eun Seon Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 582 days.

(21) Appl. No.: 15/037,029

(22) PCT Filed: Dec. 4, 2015

(86) PCT No.: PCT/KR2015/013194
§ 371 (c)(1),
(2) Date: May 16, 2016

(87) PCT Pub. No.: WO2016/089150
PCT Pub. Date: Jun. 9, 2016

(65) Prior Publication Data
US 2016/0347937 A1    Dec. 1, 2016

(30) Foreign Application Priority Data

Dec. 5, 2014 (KR) .................. 10-2014-0173796
Dec. 4, 2015 (KR) .................. 10-2015-0171890

(51) Int. Cl.
*C08K 9/06* (2006.01)

(52) U.S. Cl.
CPC .......... *C08K 9/06* (2013.01); *C08K 2201/003* (2013.01); *C08K 2201/011* (2013.01)

(58) Field of Classification Search
CPC ................ C08K 9/06; C08K 2201/011; C08K 2201/003
See application file for complete search history.

(56) References Cited

U.S. PATENT DOCUMENTS

| 2003/0159773 A1* | 8/2003 | Tomiyama ................. C09J 7/10 156/248 |
| 2011/0001251 A1* | 1/2011 | Gou ..................... C09J 133/068 257/783 |
| 2011/0034590 A1* | 2/2011 | Kuhn ....................... C08K 3/36 523/351 |
| 2013/0203914 A1 | 8/2013 | Debnath et al. |

FOREIGN PATENT DOCUMENTS

| JP | 03-258838 A | 11/1991 |
| JP | 2003-313379 A | 11/2003 |
| KR | 10-1996-0014229 A | 5/1996 |
| KR | 10-0887316 B1 | 3/2009 |
| KR | 10-2009-0071931 A | 7/2009 |
| KR | 10-2011-0014154 A | 2/2011 |

OTHER PUBLICATIONS

Machine English translation of KR 10-2011-0014154 (Year: 2011).*
Nah et al., "Plasma surface modification of silica and its effect on properties of styrene-butadiene rubber compound", Polym Int., 51: 510-518 (Year: 2002).*
Deok et al., machine English translation of KR 10-2009-0071931 (Year: 2009).*
International Search Report for International Patent Application No. PCT/KR2015/013194 filed Dec. 4, 2015.

* cited by examiner

*Primary Examiner* — Jessica M Roswell

(57) ABSTRACT

The present invention relates to a heat-resistant resin and a method of preparing the same. More particularly, the present invention relates to a heat-resistant resin including 100 parts by weight of a styrene based resin and 0.5 to 5 parts by weight of silica having a contact angle of 10 to 60° and an average particle diameter of 0.1 nm or more and 100 nm or less, a method of preparing the same and a heat-resistant resin composition including the same. In accordance with the present invention, provided are a heat-resistant resin having a low moisture content and a small content of fine particles while having heat resistance equal to or higher than conventional resins and, accordingly, superior cohesion, a method of preparing the same, and a heat-resistant resin composition including the same.

10 Claims, No Drawings

HEAT-RESISTANT RESIN AND METHOD OF PREPARING THE SAME

CROSS-REFERENCE TO RELATED APPLICATION(S)

This application is a U.S. National Stage of PCT/KR2015/013194, filed Dec. 4, 2015, which claims the benefit of Korean Patent Application No. 10-2014-0173796 filed on 5 Dec. 2014 and Korean Patent Application No. 10-2015-0171890 filed on 4 Dec. 2015 with the Korean Intellectual Property Office, the disclosures of which are incorporated herein by reference in their entirety.

TECHNICAL FIELD

The present invention relates to a heat-resistant resin and a method of preparing the same. More particularly, the present invention relates to a heat-resistant resin having a low moisture content and a small content of fine particles while having heat resistance equal to or higher than conventional resins and, accordingly superior cohesion, a method of preparing the same, and a heat-resistant resin composition including the same.

BACKGROUND ART

Recently, interest in heat-resistant resins used in components requiring heat resistance, such as electrical and electronic products and interior/exterior materials of automobiles, is increasing.

Resins having superior heat resistance are prepared into latex through emulsion polymerization and then into a powder or pellet form through a coagulation step, a dehydration step, and a drying step. However, since the prepared latex has very high glass transition temperature, coagulation is not easily carried out. In addition, since the latex has a very high moisture content (50% or higher), the latex is prepared into only a fine particle form.

As an exemplary method to address such a latex coagulation problem, there is a multistage process of inducing agglomeration of particles at high temperature via a pressure-aging process, etc. However, this multistage process is very complex.

As another example, latex may be coagulated by disturbing stability of latex particles, which are stabilized by an emulsifier added during emulsion polymerization, using a chemical method, in which various coagulants are used, or using a mechanical methods, in which mechanical force, such as strong shearing force, is used. The chemical method disturbs stability using different coagulants dependent upon emulsifier types used to secure stability of latex. The mechanical method is characterized in that strong shearing force is applied to latex such that repulsive force between emulsifiers is overcome and latex particles are agglomerated.

As a chemical coagulation method, a rapid coagulation process was suggested. This method is characterized in that an aqueous coagulant solution including inorganic salt, acid, etc. is added in a large amount such that stability of an emulsifier is disturbed and thus polymers in latex are rapidly agglomerated. Such agglomeration of latex polymer particles is called coagulation and an agglomerate of polymer particles is called slurry. Since such slurry is physically, weakly bound, it is easily broken up by external shearing force by means of a stirrer, etc. Therefore, primarily coagulated slurry is subjected to an aging process wherein temperature is elevated such that chains penetrate one another and, accordingly, binding force is increased. A resultant slurry is subjected to dehydration and drying processes. Finally, the slurry is obtained in a powder form.

In the case of the rapid coagulation wherein coagulation is carried out with a large amount of a coagulant as described above, stability of latex is very rapidly disturbed, and thus, agglomeration of polymer latex particles very rapidly and disorderedly occurs. By such disordered coagulation, an apparent specific gravity is lowered and a size distribution of final particles becomes very wide.

In addition, a slow coagulation process wherein a coagulation rate is controlled by split feeding of a coagulant to improve characteristics of a powder of generated final particles was suggested. The coagulation occurs in a secondary well area in which an energy barrier is present, whereby a coagulation rate is low and rearrangement of particles may be carried out. Accordingly, it is possible to prepare spherical particles due to regular filling. However, a use amount of total coagulants used in the slow coagulation process is similar to that of the rapid coagulation and the slow coagulation process is different from the rapid coagulation only in that coagulation is carried out by split feeding. Accordingly, generation of much wastewater due to use of a large amount of coagulants cannot be avoided. In addition, in the case of a primary coagulation bath, a small amount of a coagulant is added, compared to the rapid coagulation, and thus, the viscosity of a slurry increases. Accordingly, so as to secure flowability, a large amount of water should be added, compared to the rapid coagulation. In addition, the slow coagulation process disadvantageously has a high moisture content, compared to the rapid coagulation.

Therefore, there is a need for a heat-resistant resin to increase dispersibility by improving particle size characteristics, improve coagulation characteristics, and reduce a moisture content and a method of preparing the same.

RELATED ART DOCUMENTS

Patent Documents (Patent Document 1) KR10-2006-0034903 A
(Patent Document 2) KR10-2010-0132803 A

DISCLOSURE

Technical Problem

Therefore, the present invention has been made in view of the above problems. The present inventors confirmed, when performing related research, that particle size characteristics of latex are improved in a coagulation process of the latex when a constant amount of silica is additionally added upon preparation of the latex, and thus, dispersibility is improved and, even while having glass transition temperature equal to or higher than that in conventional resins, coagulation characteristics are improved and a moisture content is reduced, thus completing the present invention.

It is another object of the present invention to provide a heat-resistant resin having a low moisture content and a small content of fine particles while having heat resistance equal to or higher than conventional resins and, accordingly superior cohesion, a method of preparing the same, and a heat-resistant resin composition including the same.

The above and other objects can be accomplished by the present invention described below.

Technical Solution

In accordance with one aspect of the present invention, provided is a heat-resistant resin including 100 parts by weight of a styrene based resin and 0.5 to 5 parts by weight of silica having a contact angle of 10 to 60° and an average particle diameter of 0.1 nm or more and 100 nm or less.

In accordance with another aspect of the present invention, provided is a heat-resistant resin composition including a vinyl cyan compound-conjugated diene-aromatic vinyl compound copolymer and an aromatic vinyl compound-vinyl cyan compound copolymer, wherein at least one of the copolymers includes 0.5 to 5 parts by weight of silica that has a contact angle of 10 to 60° and an average particle diameter of 0.1 nm or more and 100 nm or less.

In accordance with yet another aspect of the present invention, provided is a method of preparing a heat-resistant resin, the method including an emulsion polymerization step wherein an aromatic vinyl compound and 0.5 to 5 parts by weight of silica, which has a contact angle of 10 to 60° and an average particle diameter of 0.1 nm or more and 100 nm or less, are emulsion-polymerized.

Advantageous Effects

As apparent from the fore-going, the present invention advantageously provides a heat-resistant resin having a low moisture content and a small content of fine particles while having heat resistance equal to or higher than conventional resins and, accordingly superior cohesion, a method of preparing the same, and a heat-resistant resin composition including the same.

BEST MODE

Now, the present invention will be described in more detail.

A heat-resistant resin according to the present invention includes 100 parts by weight of a styrene based resin and 0.5 to 5 parts by weight of silica having a contact angle of 10 to 60° and an average particle diameter of 0.1 nm or more and 100 nm or less.

The silica may be, for example, hydrophobic silica.

The hydrophobic silica means silica, a surface of which is modified with alkylchlorosilane, chlorosilane, trimethylsilane, trimethoxysilane, polydimethylsilane, hexamethyldisilazane (HDMS), octylsilane, or a derivative thereof so as to facilitate dispersion in a hydrophobic (or lipophilic) solvent.

In the present disclosure, a derivative of any compound means a compound, one or more hydrogen atoms, halogens, alkyl groups, or functional groups of which are substituted with other substituents (e.g., hydrogen, halogen, alkyl group, or functional group).

A contact angle of the silica, i.e., a contact angle (based on 10% by weight of silica) of a sol prepared by mixing silica with methanol, may be, for example, 40 to 60° or 45 to 58°.

When a contact angle of silica is greater than the aforementioned contact angle, hydrophobic properties of silica to improve coagulation characteristics are not sufficient and thus wettability and adhesion of silica are decreased. When a contact angle of silica is lower than the aforementioned contact angle, amphiphilicity is too high and thus coagulation characteristic improvement effects are slight.

An average particle diameter of the silica may be, for example, 0.1 nm or more and less than 100 nm, 0.1 nm or more and 30 nm or less, or 5 nm or more, and 25 nm or less.

When an average particle diameter of silica is greater than the aforementioned average particle diameter, it becomes similar to an average particle diameter of prepared latex and thus dispersibility is remarkably decreased. When an average particle diameter of silica is less than the aforementioned average particle diameter, surface energy is high and thus the silica has a strong tendency to agglomerate, whereby dispersibility thereof in a medium may be remarkably decreased.

The silica may be surface-modified, for example, by plasma treatment or with a modifier.

The modifier may be, for example, a silane modifier.

The silane modifier may be, for example, one or more selected from the group consisting of chlorosilane, alkylchlorosilane, trimethoxysilane, trimethylsilane, polydimethylsilane, hexamethyldisilazane (HDMS), octylsilane, and derivatives thereof.

The styrene based resin may be, for example, a polymerized resin including an aromatic vinyl compound.

The aromatic vinyl compound may be, for example, one or more selected from the group consisting of styrene, alpha-methylstyrene, alpha-ethylstyrene, para-methylstyrene, vinyl toluene, derivatives thereof, and the like.

In another example, the styrene based resin may be a vinyl cyan compound-conjugated diene-aromatic vinyl compound copolymer, an aromatic vinyl compound-vinyl cyan compound copolymer, or a mixture thereof.

The vinyl cyan compound may be, for example, one or more selected from the group consisting of acrylonitrile, methacrylonitrile, ethacrylonitrile, derivatives thereof, and the like.

The conjugated diene based compound may be, for example, one or more selected from the group consisting of 1,3-butadiene, isoprene, chloroprene, pentadiene, piperylene, derivatives thereof, and the like.

A moisture content of the vinyl cyan compound-conjugated diene-aromatic vinyl compound copolymer may be, for example, 32% by weight or less, 30% by weight or less, or 26% by weight or less. Within this range, superior cohesion is exhibited.

When, in the aromatic vinyl compound-vinyl cyan compound copolymer, the aromatic vinyl compound is styrene, a moisture content thereof may be, for example, 50% by weight or less, 40% by weight or less, or 35% by weight or less. When the aromatic vinyl compound is alpha-methylstyrene, a moisture content thereof may be, for example, 68% by weight or less, 50% by weight or less, or 35% by weight or less. Within this range, superior cohesion is exhibited.

In another example, the styrene based resin may be a polymerized resin including 5 to 30% by weight of the vinyl cyan compound and 25 to 75% by weight of the aromatic vinyl compound.

The silica may be mixed, for example, during polymerization of the styrene based resin.

The heat-resistant resin may include, for example, 1.5 to 5 parts by weight or 1.5 to 3 parts by weight of silica.

When silica is included in the heat-resistant resin in a greater or smaller amount than the aforementioned amount, dispersibility thereof in a medium may be decreased.

A glass transition temperature of the heat-resistant resin may be, for example, 100 to 170° C., or 125 to 150° C., or 135 to 150° C.

For example, the contact angle may be, after preparing the silica into a silica sol including 90% by weight of methanol, measured in a sessile drop mode of a Theta Lite 101-attention contact angle analyzer.

In addition, the heat-resistant resin composition according to the present invention includes a vinyl cyan compound-conjugated diene-aromatic vinyl compound copolymer and an aromatic vinyl compound-vinyl cyan compound copolymer, wherein at least one of the copolymers includes 0.5 to 5 parts by weight of silica, which has a contact angle of 10 to 60° and an average particle diameter of 0.1 nm or more and 100 nm or less, based on 100 parts by weight of the copolymer.

The heat-resistant resin composition may include, for example, 10 to 50% by weight, 15 to 40% by weight, or 20 to 30% by weight of the vinyl cyan compound-conjugated diene-aromatic vinyl compound copolymer; and 50 to 90% by weight, 60 to 85% by weight, or 70 to 80% by weight of the aromatic vinyl compound-vinyl cyan compound copolymer. Within these ranges, superior mechanical properties and heat resistance are exhibited.

The heat-resistant resin composition may further include, for example, an inorganic additive. The inorganic additive may be a metal stearate. In a specific example, the inorganic additive may be magnesium stearate. In this case, heat resistance is improved without affecting other properties.

The amount of the inorganic additive may be, for example, 0.1 to 5 parts by weight, 0.5 to 3 parts by weight, or 1.5 to 2.5 parts by weight based on 100 parts by weight of a total of the copolymers. Within this range, heat resistance is improved without affecting other properties.

In addition, the method of preparing the heat-resistant resin includes an emulsion polymerization step wherein 100 parts by weight of a total of monomers including an aromatic vinyl compound and 0.5 to 5 parts by weight of silica having a contact angle of 10 to 60° and an average particle diameter of 0.1 nm or more and 100 nm or less are emulsion-polymerized.

The monomers including the aromatic vinyl compound may include, for example, an aromatic vinyl compound, a conjugated diene rubber and a vinyl cyan compound; or an aromatic vinyl compound and a vinyl cyan compound.

The emulsion polymerization may be carried out, for example, by a batch process, a semi-batch process, or a continuous process.

The silica may be, for example, mixed with an aromatic vinyl compound and then added at a polymerization initiation time point or after polymerization initiation such that a polymerization conversion rate becomes 20 to 50% or 30 to 40%.

The polymerization conversion rate may be calculated according to Equation 1 below after drying 1.5 g of a prepared latex for 15 minutes in a 150° C. hot air dryer and then measuring the weight of the dried latex to find a total solids content (TSC).

$$\text{POLYMERIZATION CONVERSION RATE}(\%) = \frac{\left(\begin{array}{c}\text{PARTS BY WEIGHT OF ADDED}\\\text{MONOMERS AND SUPPLEMENTARY}\\\text{RAW MATERIAL}\end{array}\right) - \left(\begin{array}{c}\text{PARTS BY WEIGHT OF}\\\text{SUPPLEMENTARY RAW MATERIAL}\\\text{EXCEPT FOR MONOMERS}\end{array}\right)}{\text{TOTAL SOLIDS CONTENT (TSC)}} \times 100$$

[Equation 1]

Now, preferred embodiments are provided to aid in understanding of the present invention. The embodiments are shown by way of example and those skilled in the art will appreciate that various modifications and changes can be made to the present invention without departing from the spirit and essential characteristics of the present invention. In addition, it is to be appreciated that such modifications and changes are included in the scope of the accompanying claims.

EXAMPLES

Example 1

Preparation of Polybutadiene Rubber Latex 65 parts by weight of deionized water, 75 parts by weight of 1,3-butadiene as a monomer, 1.2 parts by weight of a rosin acid potassium salt as an emulsifier, 0.8 part by weight of an oleic acid potassium salt, 3.0 parts by weight of acrylonitrile, 1.5 parts by weight of potassium carbonate ($K_2CO_3$) as an electrolyte, 0.3 part by weight of tertiary dodecyl mercaptan (TDDM) as a molecular weight controller, and 0.3 part by weight of potassium persulfate ($K_2S_2O_8$) as an initiator were fed batchwise into a polymerization reactor filled with a nitrogen atmosphere, and reaction was carried out at 65° C. up to a polymerization conversion rate of 30 to 40%.

Subsequently, 15 parts by weight of 1,3-butadiene was added thereto batchwise and reaction was carried out at 75° C. up to a polymerization conversion rate of 60%. Subsequently, 10 parts by weight of a 1,3-butadiene remainder was added thereto batchwise and temperature was elevated to 80° C., followed by terminating reaction when a polymerization conversion rate was 93%. As a result, a polybutadiene rubber latex was prepared.

Preparation of Acrylonitrile Butadiene Styrene (ABS) Latex 60 parts by weight of the prepared polybutadiene rubber latex (based on solid), 70 parts by weight of deionized water, 0.1 part by weight of sodium ethylene diamine tetraacetate, 0.005 part by weight of ferrous sulfate, 0.23 part by weight of formaldehyde sodium sulfoxylate, and 0.35 part by weight of rosin acid potassium was fed into a reactor batchwise and temperature was elevated to 70° C.

Subsequently, an emulsion mixture including styrene (including 30 parts by weight of styrene and 1.5 parts by weight of silica), in which hydrophobic silica was uniformly dispersed, 30 parts by weight of deionized water, 0.65 parts by weight of rosin acid potassium, 10 parts by weight of acrylonitrile, 0.4 part by weight of tertiary dodecyl mercaptan, and 0.4 part by weight of diisopropylbenzene hydroperoxide were continuously added thereto over three hours and then polymerization temperature was elevated to 80° C., followed by aging for one hour. A reaction was terminated and, as a result, an ABS latex was prepared.

The styrene, in which hydrophobic silica was uniformly dispersed, was prepared by mixing 30 parts by weight of styrene and 1.5 parts by weight of hydrophobic silica having an average particle diameter of 7 nm (manufactured by EVONIK, Germany and trademark-registered as AEROSIL®, R812S 7 nm hydrophobic fumed silica), followed by stirring for 30 minutes.

ABS Latex Coagulation

The prepared ABS latex was collected according to the following method. First, 10 kg of deionized water was fed into a coagulation reactor and then 3 parts by weight of an aqueous sulfuric acid solution was added thereto, followed by elevating temperature to 75° C. while stirring. After elevating temperature, 3 kg of ABS latex (based on solid) was fed thereinto. Here, the feeding was carried out as portionwise over five minutes. After the feeding, temperature was elevated up to 90° C. and aging was carried out for three minutes, following by collecting a slurry. The collected slurry was dehydrated for three minutes at 1,800 rpm/min by means of a centrifugal dehydrator and then dried for two hours in a fluidized bed dryer. As a result, a dry powder was collected.

Example 2

A powder was prepared in the same manner as in Example 1, except that the hydrophobic silica was used in an amount of 3 parts by weight during preparation of the ABS latex.

Example 3

A powder was prepared in the same manner as in Example 1, except that hydrophobic silica having an average particle diameter of 20 nm (manufactured by EVONIK, Germany and trademark-registered as AEROSIL® R805 20 nm hydrophobic fumed silica) was used instead of the hydrophobic silica having an average particle diameter of 7 nm during preparation of the ABS latex.

Example 4

A powder was prepared in the same manner as in Example 1, except that 3 parts by weight of hydrophobic silica having an average particle diameter of 20 nm (manufactured by EVONIK, Germany and trademark-registered as AEROSIL® R805 20 nm hydrophobic fumed silica) was used instead of the hydrophobic silica having an average particle diameter of 7 nm during preparation of the ABS latex.

Example 5

A powder was prepared in the same manner as in Example 1, except that 3 parts by weight of hydrophobic silica having an average particle diameter of 100 nm (manufactured by EVONIK, Germany and trademark-registered as AEROSIL® R202 100 nm hydrophobic fumed silica) was used instead of the hydrophobic silica having an average particle diameter of 7 nm and an average particle diameter of 100 nm during preparation of the ABS latex.

Example 2-1

A powder was prepared in the same manner as in Example 1, except that 5 parts by weight of hydrophobic silica was used as summarized in Table 5 below.

Example 2-2

A powder was prepared in the same manner as in Example 1, except that 0.5 part by weight of hydrophobic silica was used as summarized in Table 5 below.

Example 6

Preparation of Styrene Acrylonitrile (SAN) Copolymer Latex 70 parts by weight of styrene and 3 parts by weight of hydrophobic silica having an average particle diameter of 7 nm (manufactured by EVONIK, Germany and trademark-registered as AEROSIL® R812S 7 nm hydrophobic fumed silica) were mixed and then stirred for 30 minutes to be uniformly dispersed.

Subsequently, styrene (including 70 parts by weight of styrene and 3 parts by weight of hydrophobic silica), in which the hydrophobic silica was uniformly dispersed, 140 parts by weight of deionized water, 2.0 parts by weight of sodium dibenzenesulfonate as an emulsifier, 18 parts by weight of acrylonitrile, 0.1 part by weight of sodium phosphate (Na3PO4) as an electrolyte, 0.45 part by weight of tertiary dodecyl mercaptan (TDDM) as a molecular weight controller, 0.05 part by weight of t-butyl hydroperoxide as an initiator, 0.025 part by weight of dextrose, 0.05 part by weight sodium pyrophosphate, and 0.0005 part by weight of ferrous sulfate were fed batchwise into a polymerization reactor filled with a nitrogen atmosphere and reaction was carried at 50° C. when a polymerization conversion rate became 30 to 40%. Subsequently, 25 parts by weight of deionized water, 12 parts by weight of acrylonitrile, and 0.5 parts by weight of sodium dibenzenesulfonate were continuously added thereto in an emulsified state and temperature was elevated to 80° C. Subsequently, reaction was terminated when a polymerization conversion rate became 98%, thereby preparing a SAN copolymer latex.

SAN Copolymer Latex Coagulation

The prepared SAN copolymer latex was coagulated according to the following method. First, 10 kg of deionized water was fed into a coagulation reactor and then calcium chloride, as a coagulant, was added thereto in an amount of 3 parts by weight based on 100 parts by weight of the latex solid. Temperature was elevated up to 95° C. and then 3 kg of the prepared SAN copolymer latex (based on solid) was added thereto. Here, the latex was added thereto portionwise over five minutes. The coagulated slurry was dehydrated for three minutes at 1,800 rpm/min by means of a centrifugal dehydrator and then dried for two hours in a fluidized bed dryer. As a result, a powder was collected.

Example 7

A powder was prepared in the same manner as in Example 6, except that the hydrophobic silica was used in an amount of 5 parts by weight during preparation of the SAN copolymer latex.

Example 8

A powder was prepared in the same manner as in Example 6, except that hydrophobic silica having an average particle diameter of 20 nm (manufactured by EVONIK, Germany and trademark-registered as AEROSIL® R805 20 nm hydrophobic fumed silica) was used instead of the hydrophobic silica having an average particle diameter of 7 nm during preparation of the SAN copolymer latex.

Example 9

A powder was prepared in the same manner as in Example 6, except that 5 parts by weight of hydrophobic silica having an average particle diameter of 20 nm (manufactured by EVONIK, Germany and trademark-registered as AEROSIL® R805 20 nm hydrophobic fumed silica) was used instead of the hydrophobic silica having an average particle diameter of 7 nm during preparation of the SAN copolymer latex.

Example 10

A powder was prepared in the same manner as in Example 6, except that hydrophobic silica having an average particle diameter of 100 nm (manufactured by EVONIK, Germany and trademark-registered as AEROSIL® R202 100 nm hydrophobic fumed silica) was used instead of the hydrophobic silica having an average particle diameter of 7 nm during preparation of the SAN copolymer latex.

Example 7-1

A powder was prepared in the same manner as in Example 6, except that 73% by weight of styrene, 27% by weight of acrylonitrile, and 1.5 parts by weight of hydrophobic silica were used as summarized in Table 5 below.

Example 7-2

A powder was prepared in the same manner as in Example 6, except that 73% by weight of styrene, 27% by weight of acrylonitrile, and 0.5 part by weight of hydrophobic silica were used as summarized in Table 5 below.

Example 11

Preparation of Heat-Resistant SAN Copolymer Latex 73 parts by weight of alpha-methylstyrene and 3 parts by weight of hydrophobic silica having an average particle diameter of 7 nm (manufactured by EVONIK, Germany and trademark-registered as AEROSIL® R812S 7 nm hydrophobic fumed silica) were mixed and then stirred for 30 minutes to be uniformly dispersed.

Subsequently, alpha-methylstyrene (including 73 parts by weight of alpha-methylstyrene and 3 parts by weight of hydrophobic silica), in which the hydrophobic silica was uniformly dispersed, 140 parts by weight of deionized water, 2.0 parts by weight of sodium dibenzenesulfonate as an emulsifier, 15 parts by weight of acrylonitrile, 0.1 part by weight of sodium phosphate (Na3PO4) as an electrolyte, 0.45 part by weight of tertiary dodecyl mercaptan (TDDM) as a molecular weight controller, 0.05 part by weight of t-butyl hydroperoxide as an initiator, 0.025 part by weight of dextrose, 0.05 part by weight sodium of pyrophosphate, and 0.0005 part by weight of ferrous sulfate were fed batchwise into a polymerization reactor filled with a nitrogen atmosphere and reaction was carried at 50° C. when a polymerization conversion rate became 30 to 40%. Subsequently, 25 parts by weight of deionized water, 12 parts by weight of acrylonitrile, and 0.5 part by weight of sodium dibenzenesulfonate were continuously added thereto in an emulsified state and temperature was elevated to 80° C. Subsequently, reaction was terminated when a polymerization conversion rate became 98%, thereby preparing a heat-resistant SAN copolymer latex.

Coagulation of Heat-Resistant SAN Copolymer Latex

The prepared heat-resistant SAN copolymer latex was coagulated according to the following method. First, 10 kg of deionized water was fed into a coagulation reactor and then calcium chloride, as a coagulant, was added thereto in an amount of 3 parts by weight based on 100 parts by weight of the solid latex. Temperature was elevated up to 95° C. and then 3 kg of the prepared heat-resistant SAN copolymer latex (based on solid) was added thereto. Here, the latex was added thereto portionwise over five minutes. The coagulated slurry was dehydrated for three minutes at 1,800 rpm/min by means of a centrifugal dehydrator and then dried for two hours in a fluidized bed dryer. As a result, a powder was collected.

Example 12

A powder was prepared in the same manner as in Example 11, except that the hydrophobic silica was used in an amount of 5 parts by weight during preparation of the heat-resistant SAN copolymer latex.

Example 13

A powder was prepared in the same manner as in Example 11, except that hydrophobic silica having an average particle diameter of 20 nm (manufactured by EVONIK, Germany and trademark-registered as AEROSIL® R805 20 nm hydrophobic fumed silica) was used instead of the hydrophobic silica having an average particle diameter of 7 nm during preparation of the heat-resistant SAN copolymer latex.

Example 14

A powder was prepared in the same manner as in Example 11, except that 5 parts by weight of hydrophobic silica having an average particle diameter of 20 nm (manufactured by EVONIK, Germany and trademark-registered as AEROSIL® R805 20 nm hydrophobic fumed silica) was used instead of the hydrophobic silica having an average particle diameter of 7 nm during preparation of the heat-resistant SAN copolymer latex.

Example 15

A powder was prepared in the same manner as in Example 11, except that hydrophobic silica having an average particle diameter of 100 nm (manufactured by EVONIK, Germany and trademark-registered as AEROSIL® R202 100 nm hydrophobic fumed silica) was used instead of the hydrophobic silica having an average particle diameter of 7 nm during preparation of the heat-resistant SAN copolymer latex.

Example 12-1

A powder was prepared in the same manner as in Example 11, except that hydrophobic silica was used in an amount of 1.5 parts by weight as summarized in Table 5 below.

Example 12-2

A powder was prepared in the same manner as in Example 11, except that hydrophobic silica was used in an amount of 0.5 part by weight as summarized in Table 5 below.

Comparative Example 1

A powder was prepared in the same manner as in Example 1, except that 30 parts by weight of only styrene was fed instead of a mixture of 30 parts by weight of styrene and 1.5 parts by weight of hydrophobic silica having an average particle diameter of 7 nm (manufactured by EVONIK, Germany and trademark-registered as AEROSIL® R812S 7 nm hydrophobic fumed silica) during preparation of the ABS latex.

Comparative Example 2

A powder was prepared in the same manner as in Comparative Example 1, except that 70 parts by weight of deionized water was fed and then 1.5 parts by weight of hydrophilic silica having an average particle diameter of 20 nm was additionally fed during preparation of ABS latex.

Comparative Example 3

A powder was prepared in the same manner as in Comparative Example 2, except that 3 parts by weight of hydrophilic silica having an average particle diameter of 20 nm was fed during preparation of ABS latex.

Comparative Example 4

A powder was prepared in the same manner as in Example 6, except that 70 parts by weight of only styrene was fed instead of a mixture including 70 parts by weight of styrene and 3 parts by weight of hydrophobic silica having an average particle diameter of 7 nm (manufactured by EVONIK, Germany and trademark-registered as AEROSIL® R812S 7 nm hydrophobic fumed silica) during preparation of SAN copolymer latex.

Comparative Example 5

A powder was prepared in the same manner as in Comparative Example 4, except that 140 parts by weight of deionized water was added and then 3 parts by weight of hydrophilic silica having an average particle diameter of 20 nm was additionally added during preparation of SAN copolymer latex.

Comparative Example 6

A powder was prepared in the same manner as in Comparative Example 5, except that hydrophilic silica having an average particle diameter of 20 nm was added in an amount of 5 parts by weight during preparation of SAN copolymer latex.

Comparative Example 7

A powder was prepared in the same manner as in Example 11, except that 73 parts by weight of only alpha-methylstyrene was added instead of a mixture of 73 parts by weight of alpha-methylstyrene and 3 parts by weight of hydrophobic silica having an average particle diameter of 7 nm (manufactured by EVONIK, Germany and trademark-registered as AEROSIL® R812S 7 nm hydrophobic fumed silica) during preparation of heat-resistant SAN copolymer latex.

Comparative Example 8

A powder was prepared in the same manner as in Comparative Example 7, except that 140 parts by weight of latex deionized water was added and then 3 parts by weight of hydrophilic silica having an average particle diameter of 20 nm was additionally added during preparation of a heat-resistant SAN copolymer.

Comparative Example 9

A powder was prepared in the same manner as in Comparative Example 8, except that hydrophilic silica having an average particle diameter of 20 nm was added in an amount of 5 parts by weight during preparation of a heat-resistant SAN copolymer latex.

The ABS latex according to each of Examples 1 to 5 and Comparative Examples 1 to 3 was prepared at a coagulation temperature of 75° C. and an aging temperature of 90° C. The SAN copolymer latex according to each of Examples 6 to 10 and Comparative Examples 4 to 6 was prepared at a coagulation temperature of 85° C. and an aging temperature of 95° C. In addition, the heat-resistant SAN copolymer latex according to each of Examples 11 to 15 and Comparative Examples 7 to 9 was prepared at a coagulation temperature of 95° C. and an aging temperature of 100° C.

Specimens for measuring properties according to Examples 1 to 15 and Comparative Examples 1 to 9 in which silica was used were prepared after being melt-kneaded. The preparation process is as follows.

A conventional ABS resin powder or the prepared ABS latex powder, a conventional SAN resin, and the prepared SAN copolymer latex powder or the prepared heat-resistant SAN copolymer latex powder were mixed in the following ratio and then 2.0 parts by weight of solid magnesium stearate was mixed therewith. A resultant mixture was pelletized at a constant temperature by means of a twin-screw extruder. A prepared pellet was injected at the following temperature to prepare a specimen for measuring properties. Each of the examples and comparative examples will be particularly described below.

The ABS latex powder prepared according to each of Examples 1 to 5 and Comparative Examples 1 to 3 and the conventional SAN resin were mixed in a weight ratio of 25:75 and then pelletized at 200° C. by means of a twin-screw extruder. A prepared pellet was injected at 220° C. to prepare a specimen. The prepared specimen was subjected to property measurement.

The SAN copolymer latex powder prepared according to each of Examples 6 to 10 and Comparative Examples 4 to 6 and the conventional ABS resin powder were mixed in a weight ratio of 75:25 and then pelletized at 200° C. by means of a twin-screw extruder. A prepared pellet was injected at 220° C. again to prepare a specimen. The prepared specimen was subjected to property measurement.

The heat-resistant SAN copolymer latex powder prepared according to each of Examples 11 to 15 and Comparative Examples 7 to 9 and the conventional ABS resin powder were mixed in a weight ratio of 77:23 and then pelletized at 240° C. by means of a twin-screw extruder. A prepared pellet was injected at 240° C. again to prepare a specimen. The prepared specimen was subjected to property measurement.

Test Example

The contact angle of the silica used in each of Examples 1 to 15 and Comparative Examples 1 to 9 was measured according to the following method. Results are summarized in Table 1 below. To measure properties of the heat-resistant resin prepared according to each of Examples 1 to 15 and Comparative Examples 1 to 9, the resin was melt-kneaded and then prepared into a specimen. Properties of the specimen were measured according to the following method. Results are summarized in Tables 2 to 5 below.

<Measurement Methods>

Contact angle: Measured using 10% by weight of a sol by means of a Theta Lite 101, Attention contact angle analyzer.

A method of measuring the contact angle of the silica is as follows.

As a sample pre-treatment process, 10% by weight of a hydrophobic silica sol was prepared by mixing 9 g of methanol and 1 g of hydrophobic silica and 10% by weight of a hydrophilic silica sol (hydrophilic silica sol) was prepared by mixing 9 g of methanol+1 g of hydrophilic silica. As an addition order, hydrophobic silica or hydrophilic silica was added after adding methanol and then shaking was performed at 200 rpm for one hour by means of a shaker. As a result, a dispersed sol was prepared.

The contact angle of the prepared sol was measured at 25° C. by means of a contact angle analyzer (Theta Lite 101, Attension) according to the following method.

First, a circular plate on which the silica sol sample was dropped was prepared. The circular plate was made of polytetrafluoroethylene (PTFE). The circular plate had a diameter of 3 cm and a thickness of about 0.5 mm.

The height of the circular plate was adjusted to a camera measurement location of the contact angle analyzer so that a plane surface of the circular plate on a screen was moved to a point coincident with a reference line, and then the circular plate was fixed so that it did not move. Subsequently, measurement was performed in a sessile drop mode among measurement modes of the contact angle analyzer. Before performing the measurement, gradation calibration was performed and then about 5 ml of a sample was fed into a syringe for injecting a sample. To minimize sample contamination of the interior of a needle, an initial amount of about 1 ml was discarded and then the syringe was fixed to the contact angle analyzer. A contact angle value was an average value measured for three minutes and the average value measurement was repeated three times. An average of the three measured values was defined as a representative value. Here, a value having a deviation of 10% or more was excluded, when the measurement was repeated, to find the average value.

When the measurement was completed, the syringe for feeding a sample was washed with tetrahydrofuran (THF) three times and re-used.

Contact angle measurement results are summarized in Table 1 below.

TABLE 1

| Classification | Hydrophobic Silica Sol | | Hydrophilic Silica Sol | Water |
|---|---|---|---|---|
| Silica average particle diameter (nm) | 7 | 20 | 100 | 20 | — |
| Representative value of contact angle (°) | 57 | 49 | 47 | 67 | 98 |
| Surface modifier | HDMS | Octylsilane | PDMS | — | — |

HDMS: Hexamethyldisilazane,
PDMS: Polydimethylsilane

In general, when a contact angle is 0°, amphiphilicity of a solid surface to a fluid is greatest and the solid surface is completely wet with the fluid. When a contact angle is 90° or more, amphiphilicity of a solid surface to a fluid is considered to be absent. In the measurement, since the circular plate on which the silica sol sample is dropped is very hydrophobic, hydrophilicity is high with increasing contact angle of silica.

Accordingly, it can be confirmed that, as summarized in Table 1, the contact angles of the hydrophobic silica sols are 60° or less, the contact angle of the silica having an average particle diameter of 100 nm is lowest, and the contact angles of the hydrophobic silica sols are much lower than the contact angle, i.e., 98°, of water and lower than the contact angle, i.e., 67°, of hydrophilic silica.

Average particle diameter of silica: Measured by means of a particle diameter measurement instrument (CHDF manufactured by Matec Applied Sciences).

Moisture content: Weight changes were measured by means of a moisture meter (Mettler/Toledo HR83-P) until water was completely evaporated at 150° C. and thus the weight of a sample was not changed (remaining moisture content: 0.5% by weight or less).

Particle diameter: Vibration shaking was carried out using a standard screen by means of a particle diameter measurement instrument to perform size classification. The contents of large particles (coarse particles) having a size of 1,400 μm or more and fine particles having a size of 75 μm or less were measured to measure particle diameters.

Impact strength (Izod Impact): Measured according to ASTM D256 as a standard measurement method.

Glass transition temperature: Measured by means of Q20 DSC manufactured by TA instruments.

Results of Examples 1 to 5 and Comparative Examples 1 to 3 are summarized in Table 2 below.

TABLE 2

| | | | Examples | | | | | Comparative Examples | | |
|---|---|---|---|---|---|---|---|---|---|---|
| Items | | | 1 | 2 | 3 | 4 | 5 | 1 | 2 | 3 |
| Polymerization characteristics | Monomers | Butadiene (% by weight) | 60 | 60 | 60 | 60 | 60 | 60 | 60 | 60 |
| | | Styrene (% by weight) | 30 | 30 | 30 | 30 | 30 | 30 | 30 | 30 |
| | | Alpha-methyl-styrene (% by weight) | | | | | | | | |
| | | Acrylonitrile (% by weight) | 10 | 10 | 10 | 10 | 10 | 10 | 10 | 10 |
| | Hydrophobic monomer | Size (nm) | 7 | 7 | 20 | 20 | 100 | | | |
| | | Content (parts by weight) | 1.5 | 3 | 1.5 | 3 | 3 | | | |
| | Hydrophilic monomer | Size (nm) | | | | | | | 20 | 20 |
| | | Content (parts by weight) | | | | | | | 1.5 | 3 |

TABLE 2-continued

|  |  |  | Examples | | | | | Comparative Examples | | |
|---|---|---|---|---|---|---|---|---|---|---|
| Items | | | 1 | 2 | 3 | 4 | 5 | 1 | 2 | 3 |
| Material properties | Moisture content | (%) | 24 | 20 | 26 | 22 | 32 | 33 | 32 | 33 |
|  | Particle diameter | Coarse (%) | 22.1 | 25.7 | 20.5 | 23.9 | 17.0 | 17.2 | 16.8 | 17.5 |
|  |  | Fine particles (%) | 2.4 | 1.3 | 3.2 | 2.0 | 5.9 | 5.6 | 6.3 | 5.9 |
|  | Impact strength | (kgf/cm$^2$) | 31.4 | 27.2 | 28.1 | 25.7 | 23.1 | 32.3 | 28.7 | 23.5 |

As shown in Table 2, it can be confirmed that, in Examples 1 to 5 in which the hydrophobic silica is additionally added, a moisture content and particle size characteristics are greatly improved and thus superior property balance is exhibited, compared to Comparative Example 1 in which silica is not additionally added and Comparative Examples 2 to 3 in which the hydrophilic silica is additionally added.

Results of Examples 6 to 10 and Comparative Examples 4 to 6 are summarized in Table 3 below.

TABLE 3

|  |  |  | Examples | | | | | Comparative Examples | | |
|---|---|---|---|---|---|---|---|---|---|---|
| Items | | | 6 | 7 | 8 | 9 | 10 | 4 | 5 | 6 |
| Polymerization characteristics | Monomers | Butadiene (% by weight) | | | | | | | | |
|  |  | Styrene (% by weight) | 73 | 73 | 73 | 73 | 73 | 73 | 73 | 73 |
|  |  | Alpha-methyl-styrene (% by weight) | | | | | | | | |
|  |  | acrylonitrile (% by weight) | 27 | 27 | 27 | 27 | 27 | 27 | 27 | 27 |
|  | Hydrophobic monomer | Size (nm) | 7 | 7 | 20 | 20 | 100 | | | |
|  |  | Content (parts by weight) | 3 | 5 | 3 | 5 | 3 | | | |
|  | Hydrophilic monomer | Size (nm) | | | | | | | 20 | 20 |
|  |  | Content (parts by weight) | | | | | | | 3 | 5 |
| Material properties | Moisture content | (%) | 32 | 27 | 35 | 29 | 50 | 53 | 50 | 52 |
|  | Particle diameter | Coarse particles (%) | 12.3 | 15.1 | 11.7 | 14.0 | 7.9 | 8.0 | 7.6 | 8.1 |
|  |  | Fine particles (%) | 8.8 | 5.3 | 9.5 | 6.7 | 13.0 | 13.2 | 12.6 | 13.3 |
|  | Impact strength | (kgf/cm$^2$) | 16.9 | 12.3 | 15.0 | 11.1 | 9.5 | 17.9 | 14.7 | 10.0 |
|  | Glass transition temperature | (° C.) | 100.3 | 100.5 | 100.3 | 100.5 | 100.3 | 100.3 | 100.5 | 100.4 |

As shown in Table 3, it can be confirmed that, in Example 6 to 10 in which the hydrophobic silica is additionally added, a moisture content and particle size characteristics are greatly improved and thus superior property balance is exhibited, compared to Comparative Example 4 in which silica is not additionally added and Comparative Examples 5 to 6 in which the hydrophilic silica is additionally added.

Results of Examples 11 to 15 and Comparative Examples 7 to 9 are summarized in Table 4 below.

TABLE 4

| | Items | | Example 11 | Example 12 | Example 13 | Example 14 | Example 15 | Comparative Example7 | Comparative Example8 | Comparative Example9 |
|---|---|---|---|---|---|---|---|---|---|---|
| Polymerization characteristics | Monomers | Butadiene (% by weight) | — | — | — | — | — | — | — | — |
| | | Styrene (% by weight) | — | — | — | — | — | — | — | — |
| | | Alpha-methyl-styrene (% by weight) | 73 | 73 | 73 | 73 | 73 | 73 | 73 | 73 |
| | | Acrylonitrile (% by weight) | 27 | 27 | 27 | 27 | 27 | 27 | 27 | 27 |
| | Hydrophobic silica | Size (nm) | 7 | 7 | 20 | 20 | 100 | — | — | — |
| | | Content (parts by weight) | 3 | 5 | 3 | 5 | 3 | — | — | — |
| | Hydrophilic silica | Size (nm) | — | — | — | — | — | — | 20 | 20 |
| | | Content (parts by weight) | — | — | — | — | — | — | 3 | 5 |
| Material properties | Moisture content | (%) | 30 | 25 | 35 | 29 | 60 | 70 | 71 | 69 |
| | Particle diameter | Coarse particles (%) | 7.5 | 10.8 | 6.0 | 8.1 | 3.0 | 3.0 | 2.8 | 3.0 |
| | | Fine particles (%) | 14.7 | 8.1 | 18.7 | 13.2 | 30.5 | 30.5 | 29.5 | 31.5 |
| | Impact strength | (kgf/cm$^2$) | 14.0 | 9.3 | 12.5 | 7.8 | 5.6 | 14.3 | 11.1 | 6.4 |
| | Glass transition temperature | (° C.) | 135.8 | 135.7 | 135.8 | 135.6 | 135.8 | 135.6 | 1357 | 135.8 |

As shown in Table 4, it can be confirmed that, in Examples 11 to 15 in which the hydrophobic silica is additionally added, a moisture content and particle size characteristics are greatly improved and thus superior property balance is exhibited, compared to Comparative Example 7 in which silica is not additionally added and Comparative Examples 8 to 9 in which the hydrophilic silica is additionally added.

Results of Examples 2-1, 2-2, 7-1, 7-2, 12-1, and 12-2 are summarized in Table 5 below.

By such results, it can be clearly confirmed that, when the silica is additionally added during preparation of latex, preferably when the hydrophobic silica is additionally added, a heat-resistant resin having improved dispersibility due to improvement of particle size characteristics, improved coagulation characteristics, and a reduced moisture content, at a glass transition temperature equal to or higher than that in existing resins in a coagulation process of latex and a heat-resistant resin composition including the heat-resistant resin can be obtained.

TABLE 5

| | Items | | Example 2-1 | Example 2-2 | Example 7-1 | Example 7-2 | Example 12-1 | Example 12-2 |
|---|---|---|---|---|---|---|---|---|
| Polymerization characteristics | Monomers | Butadiene (% by weight) | 60 | 60 | — | — | — | — |
| | | Styrene (% by weight) | 30 | 30 | 73 | 73 | — | — |
| | | Alpha-methyl-styrene (% by weight) | — | — | — | — | 73 | 73 |
| | | Acrylonitrile (% by weight) | 10 | 10 | 27 | 27 | 27 | 27 |
| | Hydrophobic silica | Size (nm) | 7 | 7 | 7 | 7 | 7 | 7 |
| | | Content (parts by weight) | 5 | 0.5 | 1.5 | 0.5 | 1.5 | 0.5 |
| | Hydrophilic silica | Size (nm) | — | — | — | — | — | — |
| | | Content (parts by weight) | — | — | — | — | — | — |
| Material properties | Moisture content | (%) | 19 | 27 | 36 | 43 | 41 | 55 |
| | Particle diameter | Coarse particles (%) | 26.3 | 19.7 | 10.6 | 9.1 | 5.4 | 4.2 |
| | | Fine particles (%) | 1.0 | 4.3 | 10.9 | 12.0 | 20.6 | 25.1 |
| | Impact strength | (kgf/cm$^2$) | 24.5 | 32.0 | 17.1 | 17.5 | 14.1 | 14.3 |
| | Glass transition temperature | (° C.) | — | — | 100.3 | 100.3 | 135.6 | 135.5 |

The invention claimed is:

1. A heat-resistant resin, comprising:
   100 parts by weight of a styrene based resin; and
   0.5 to 5 parts by weight of silica having a contact angle of 10 to 60° and an average particle diameter of 0.1 nm or more and 7 nm or less, wherein the silica is surface-modified by plasma treatment,
   wherein the silica is provided during polymerization of the styrene based resin.

2. The heat-resistant resin according to claim 1, wherein the silica has a contact angle of 40 to 60°.

3. The heat-resistant resin according to claim 1, wherein the styrene based resin is a polymerized resin comprising an aromatic vinyl compound.

4. The heat-resistant resin according to claim 3, wherein the styrene based resin is a vinyl cyan compound-conjugated diene-aromatic vinyl compound copolymer, an aromatic vinyl compound-vinyl cyan compound copolymer, or a mixture thereof.

5. The heat-resistant resin according to claim 4, wherein the styrene based resin is a polymerized resin comprising 5 to 30% by weight of the vinyl cyan compound and 25 to 75% by weight of the aromatic vinyl compound.

6. The heat-resistant resin according to claim 1, wherein the heat-resistant resin has a glass transition temperature of 100 to 170° C.

7. The heat-resistant resin according to claim 1, wherein the contact angle is, after preparing the silica into a silica sol comprising 90% by weight of methanol, measured in a sessile drop mode of a Theta Lite 101-attention contact angle analyzer.

8. A heat-resistant resin composition, comprising a vinyl cyan compound-conjugated diene-aromatic vinyl compound copolymer and an aromatic vinyl compound-vinyl cyan compound copolymer, wherein at least one of the copolymers comprises 0.5 to 5 parts by weight of silica, which has a contact angle of 10 to 60° and an average particle diameter of 0.1 nm or more and 7 nm or less, based on 100 parts by weight of the copolymer, wherein the silica is surface-modified by plasma treatment.

9. A method of preparing a heat-resistant resin, the method comprising an emulsion polymerization step wherein 100 parts by weight of a total of monomers comprising an aromatic vinyl compound and 0.5 to 5 parts by weight of silica having a contact angle of 10 to 60° and an average particle diameter of 0.1 nm or more and 7 nm or less are emulsion-polymerized.

10. The heat-resistant resin of claim 1, wherein the silica is mixed with styrene monomer when it is provided to the polymerization.

* * * * *